US011898582B1

(12) United States Patent
Franzoni et al.

(10) Patent No.: US 11,898,582 B1
(45) Date of Patent: Feb. 13, 2024

(54) SYSTEM FOR A BENT AXIS MOTOR

(71) Applicant: Dana Motion Systems Italia S.R.L., Reggio Emilia (IT)

(72) Inventors: Federica Franzoni, Reggio Emilia (IT); Fabio Natali, Modena (IT); Alessandro Sassi, Reggio Emilia (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 0 days.

(21) Appl. No.: 18/181,448

(22) Filed: Mar. 9, 2023

(51) Int. Cl.

| | |
|---|---|
| ***F04B 1/328*** | (2020.01) |
| ***F01B 3/10*** | (2006.01) |
| ***F01B 3/00*** | (2006.01) |
| ***F04B 1/0465*** | (2020.01) |
| ***F15B 15/14*** | (2006.01) |
| ***F04B 53/10*** | (2006.01) |
| ***F04B 1/1133*** | (2020.01) |

(52) U.S. Cl.
CPC ........ *F15B 15/1409* (2013.01); *F01B 3/0055* (2013.01); *F01B 3/109* (2013.01); *F04B 1/0465* (2013.01); *F04B 1/1133* (2013.01); *F04B 1/328* (2013.01); *F04B 53/10* (2013.01)

(58) Field of Classification Search
CPC .... F04B 1/0465; F04B 1/328; F04B 27/0839; F04B 39/1066; F01B 3/0055
See application file for complete search history.

(56) References Cited

U.S. PATENT DOCUMENTS

| | | | | |
|---|---|---|---|---|
| 4,057,006 | A * | 11/1977 | Warnke | F01B 3/0055 91/487 |
| 5,231,912 | A * | 8/1993 | Akasaka | F04B 1/2085 91/499 |
| 6,829,979 | B1 | 12/2004 | Thomas | |
| 7,594,802 | B2 * | 9/2009 | Gray, Jr. | F04B 1/2007 417/269 |
| 9,175,672 | B2 * | 11/2015 | Ohno | F01B 3/0047 |
| 2007/0289441 | A1 | 12/2007 | Guggemos et al. | |
| 2013/0055888 | A1 | 3/2013 | Ohno et al. | |
| 2013/0115112 | A1 * | 5/2013 | Larkin | F04B 1/328 417/222.1 |
| 2016/0273531 | A1 | 9/2016 | Campbell et al. | |
| 2021/0095647 | A1 | 4/2021 | Parsons et al. | |

FOREIGN PATENT DOCUMENTS

WO 2018215514 A1 11/2018

OTHER PUBLICATIONS

Achten, P. et al., "Experimental Investigation of a Hydrostatic Bearing Between Barrels and Port Plates in Floating Cup Axial Piston Pumps," Proceedings og the 2020 Bath/ASME Symposium on Fluid Power and Motion Control, Sep. 9, 2020, University of Bath, Bath, United Kingdom, 12 pages.

* cited by examiner

*Primary Examiner* — Michael Leslie
(74) *Attorney, Agent, or Firm* — McCoy Russell LLP

(57) ABSTRACT

Methods and systems for a bent axis motor are described. In one example, a bent axis motor includes a valve plate coupled to at least one piston of a cylinder block, the valve plate comprising a first plurality of grooves spaced about openings of the valve plate on a first side of the valve plate facing the cylinder block, the valve plate further comprising a second plurality of grooves arranged on a second side of the valve plate facing away from the cylinder block.

19 Claims, 7 Drawing Sheets

SYSTEM FOR A BENT AXIS MOTOR

TECHNICAL FIELD

The present disclosure relates generally to hydraulic motors, and more specifically, to a bent axis motor.

BACKGROUND AND SUMMARY

A hydraulic axial piston motor may be a bent axis motor including a bent axis unit (BAU) rotary group, where the BAU rotary group is a variable displacement unit whose displacement pistons are arranged at an angle to a drive shaft of the hydraulic axial piston motor. In variable displacement units, an effective unit displacement may be varied during operation by adjusting an inclination angle of a cylinder block of the hydraulic motor, thereby controlling a torque and/or speed of the drive shaft. The cylinder block inclination angle may be adjusted by adjusting a position of a servo piston of the bent axis motor, by controlling a pressure in two chambers on either end of the servo piston. The pressure may be controlled by a dedicated regulator, which may be hydraulic or electro-hydraulic.

One issue with current BAUs is that the balancing of the unit is set during a manufacturing phase and is not adjustable during operation due to its predefined geometric characteristics. Balancing may influence mechanical efficiency and drainage. If balancing is too high, drainage of the BAU may be reduced, which may increase its volumetric efficiency at the expense of reduced mechanical efficiency. If balancing is too low, then drainage may be high, which may reduce the volumetric efficiency, while mechanical efficiency may increase. Thus, a BAU that may achieve variable balancing for support in different environments may be desired.

In one embodiment, at least a portion of the abovementioned issues may be addressed by a valve plate coupled to at least one piston of a cylinder block, the valve plate comprising a first plurality of grooves spaced about openings of the valve plate on a first side of the valve plate facing the cylinder block, the valve plate further comprising a second plurality of grooves arranged on a second side of the valve plate facing away from the cylinder block and a port cover comprising a plurality of ports for flowing fluids to the valve plate. In this way, a balancing of the valve plate may be adjusted automatically via fluid flow filling at least one or more of the grooves.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings, in which.

DETAILED DESCRIPTION

One example of a hydraulic axial piston motor is a bent axis piston motor, including a bent axis unit (BAU). The BAU includes a rotary group of cylinders (also referred to herein as a BAU rotary group) housed within a cylinder block that is rotated by a pump via a fluid pressurized thereby. The BAU allows the cylinder block to be aligned at an angle of inclination with an output shaft of the BAU. As the inclination angle between the cylinder block and the output shaft is increased, a displacement of the BAU and the bent axis piston motor may be increased, which may result in more torque being delivered at the output shaft. As the inclination angle between the cylinder block and the output shaft is decreased, the displacement may be decreased, which may result in less torque being delivered at the output shaft.

The BAU of the present disclosure may be a variable balancing bent axis piston motor, including a valve plate with one or more cutouts and grooves that facilitate the variable balancing described herein. The valve plate includes different areas that may be provided different pressures of hydraulic fluid, this, in combination with the customized cutouts, provides automatic variable balancing of the BAU, which may increase mechanical and volumetric efficiency of the unit across a wider range of operating conditions. Automatic balancing of the valve plate may include where a balancing of the valve plate is adjusted without actuation of a valve and completed via fluid flow to and from grooves of the valve plate.

Figure 1:
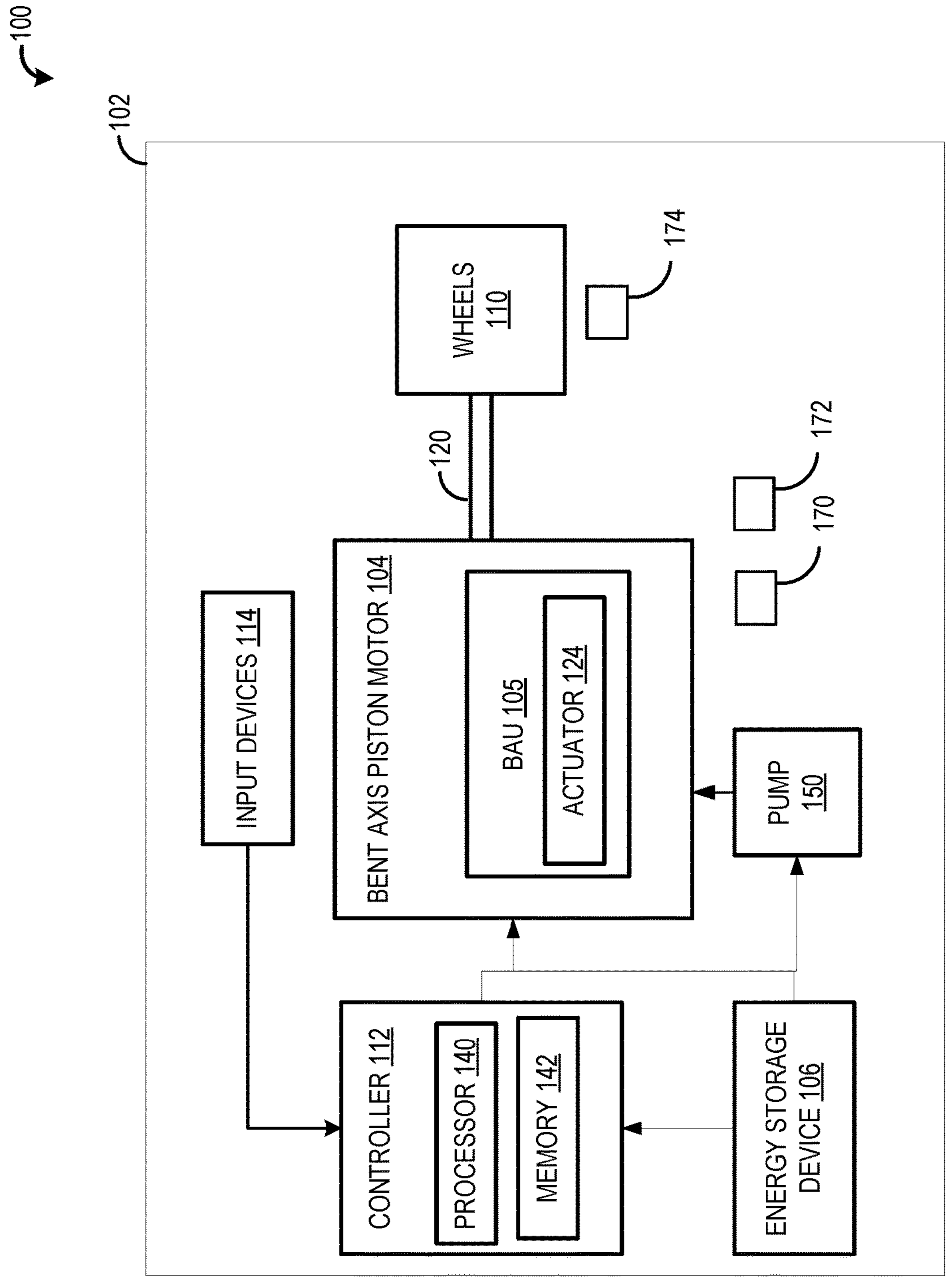
FIG. 1 is a schematic representation of a bent axis piston motor system, in accordance with one or more embodiments of the present disclosure.
Figure 2:
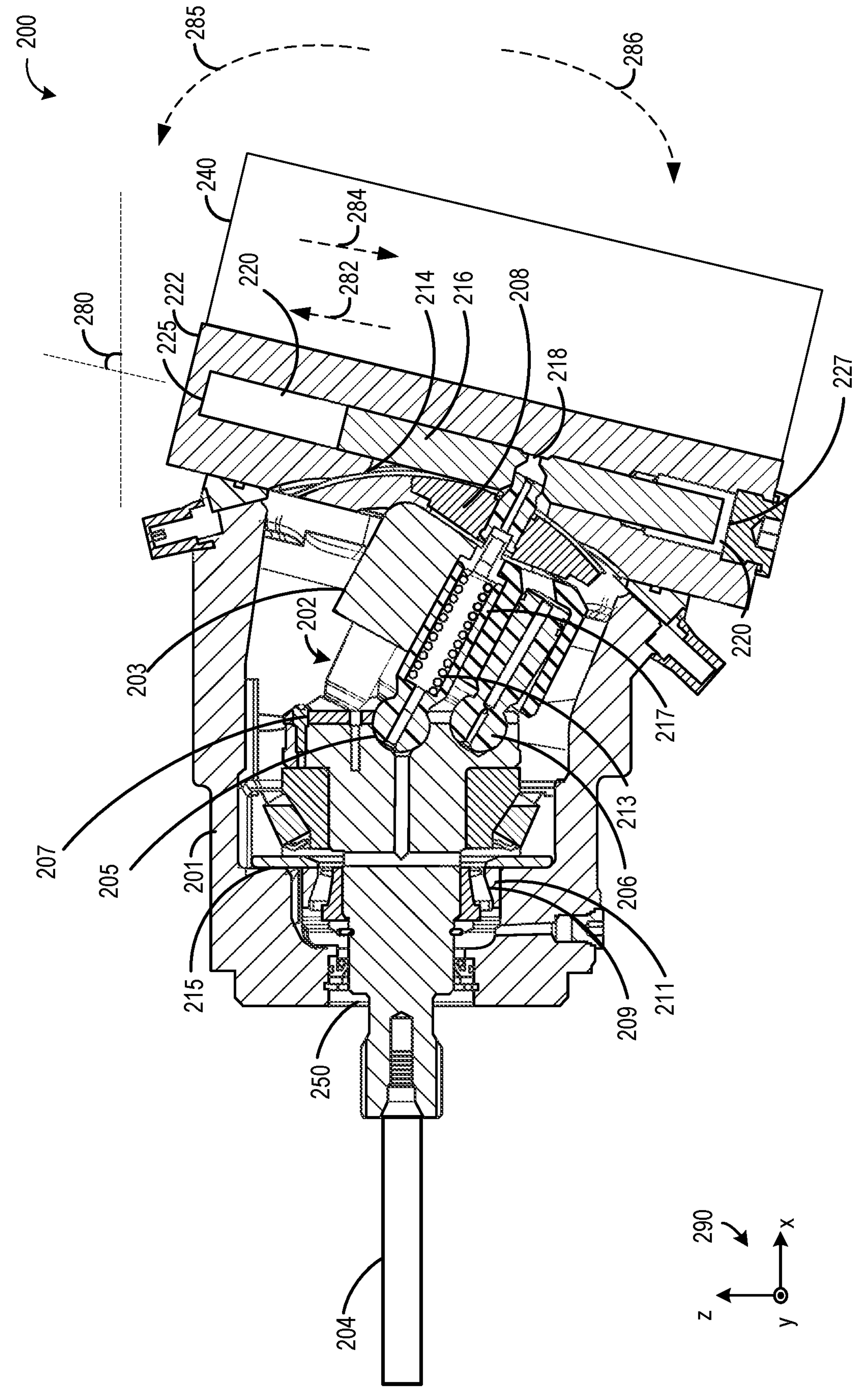
FIG. 2 is a cross-sectional schematic of a bent axis piston motor system, in accordance with one or more embodiments of the present disclosure.
Figure 3A:
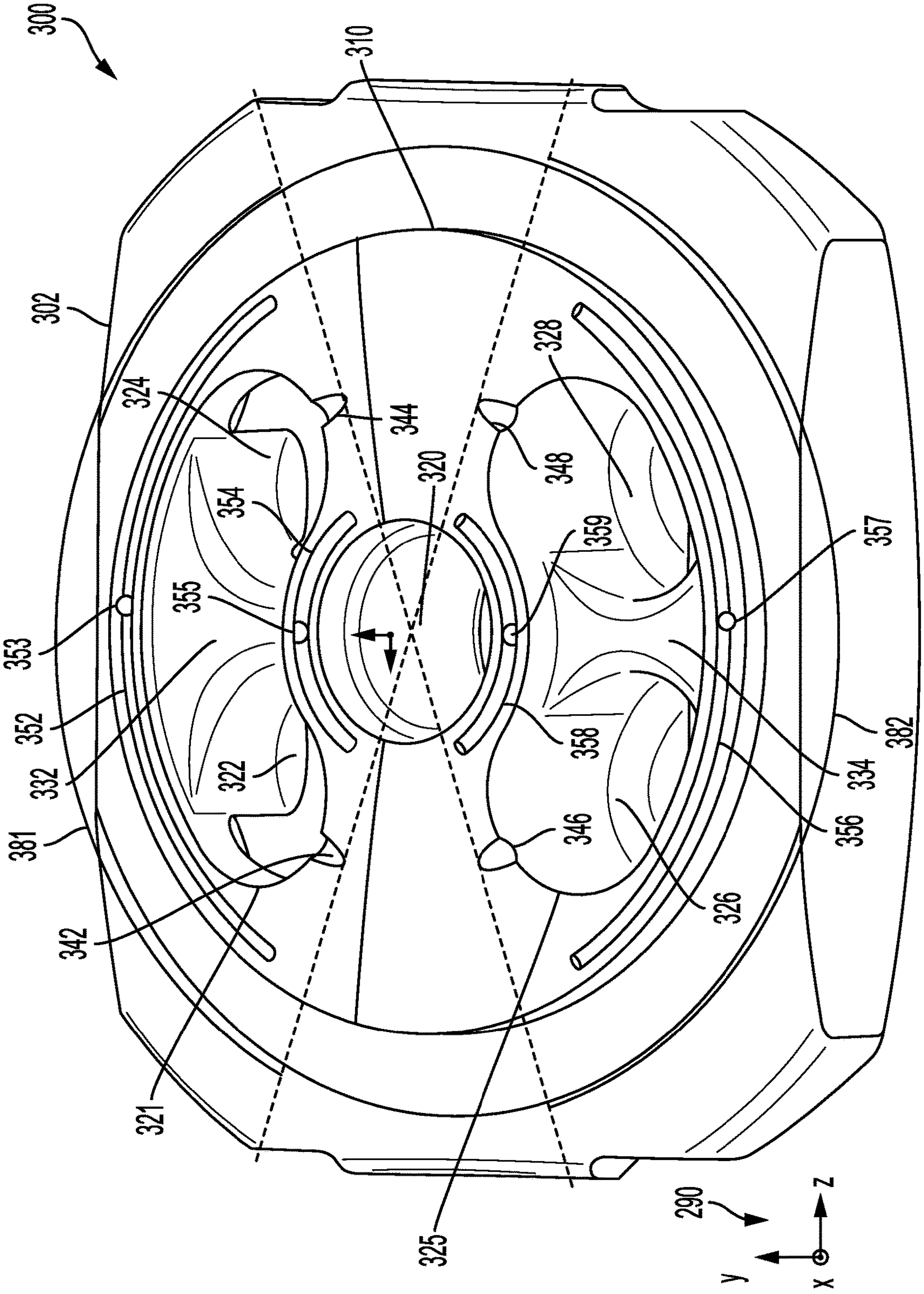
FIG. 3A is a schematic of a first side of a valve plate of a bent axis piston motor system, in accordance with one or more embodiments of the present disclosure.
Figure 3B:
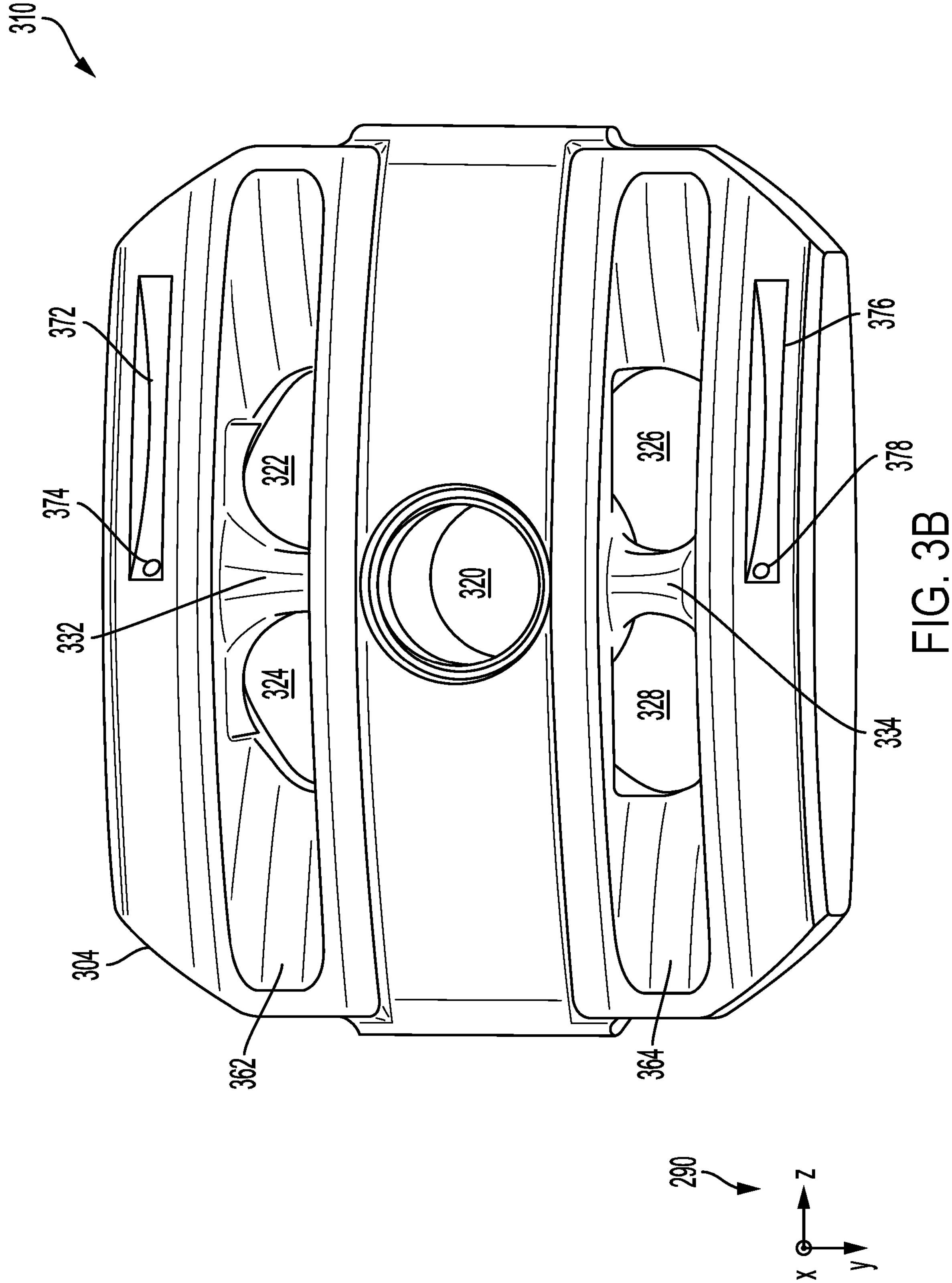
FIG. 3B is a schematic of a second side of a valve plate of a bent axis motor system, in accordance with one or more embodiments of the present disclosure.
Figure 4:
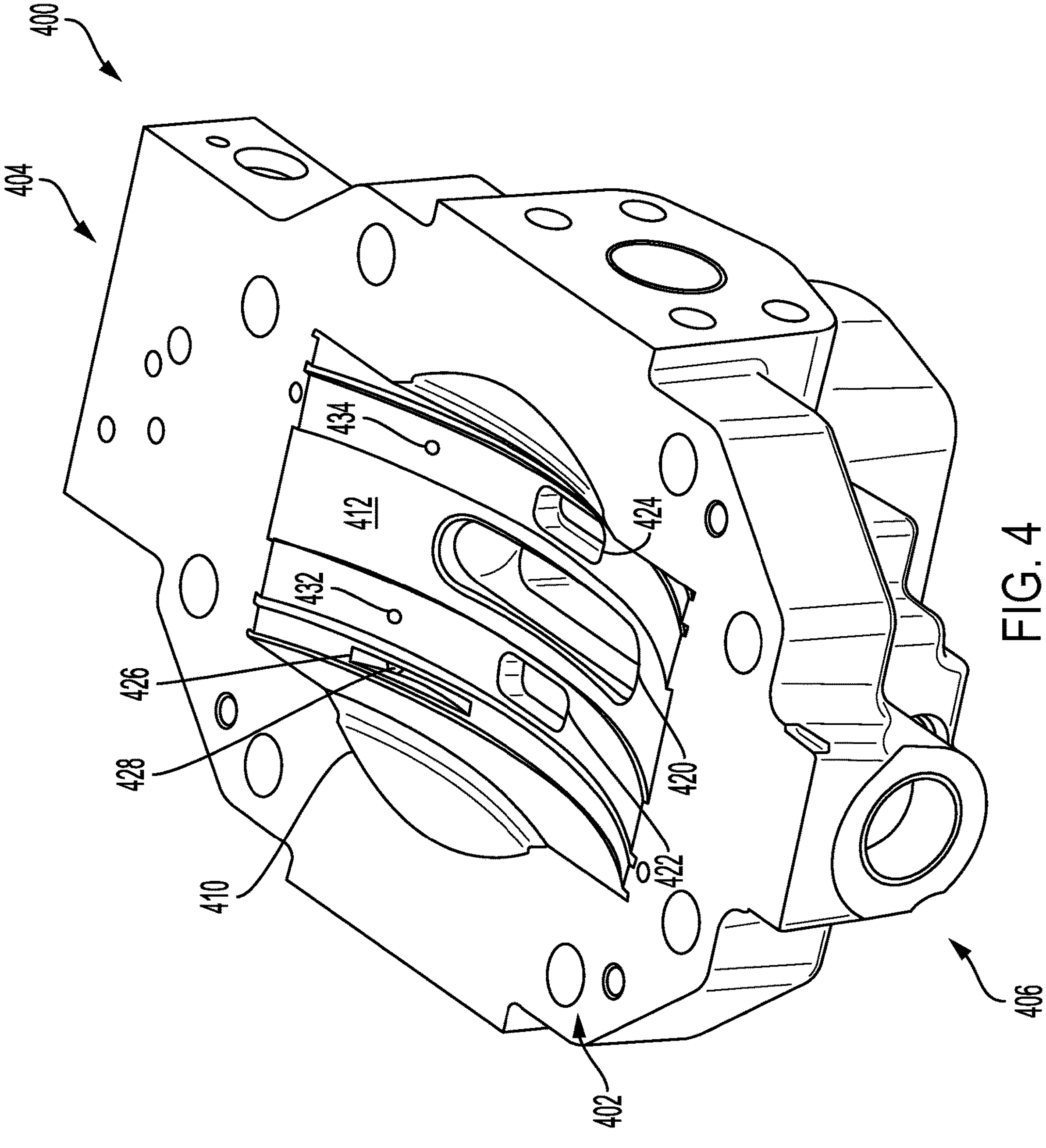
FIG. 4 is a schematic of a cover of a servo piston housing of a bent axis piston motor system, in accordance with one or more embodiments of the present disclosure.
Figure 5C:
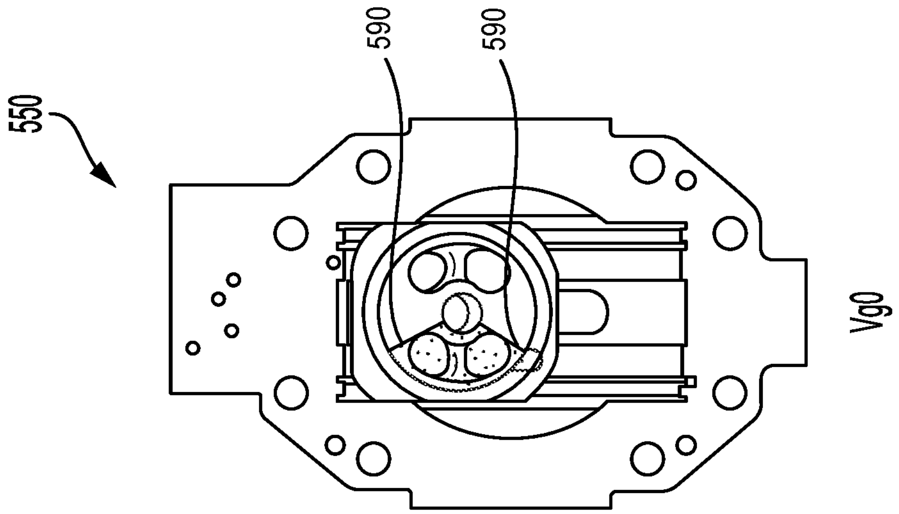
FIGS. 5A, 5B, and 5C show different positions of a bent axis piston motor system comprising the valve plate and servo piston block of FIGS. 3A, 3B, and 4, in accordance with one or more embodiments of the present disclosure.
Figure 5B:
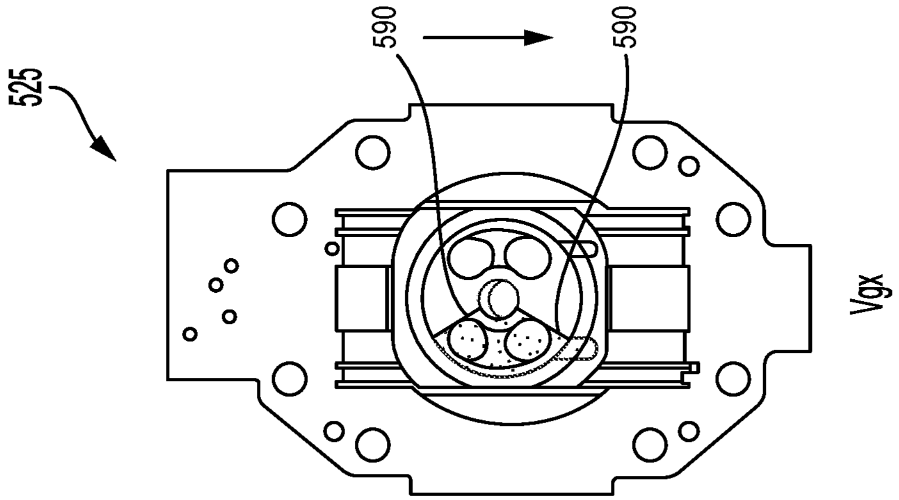
Figure 5A:
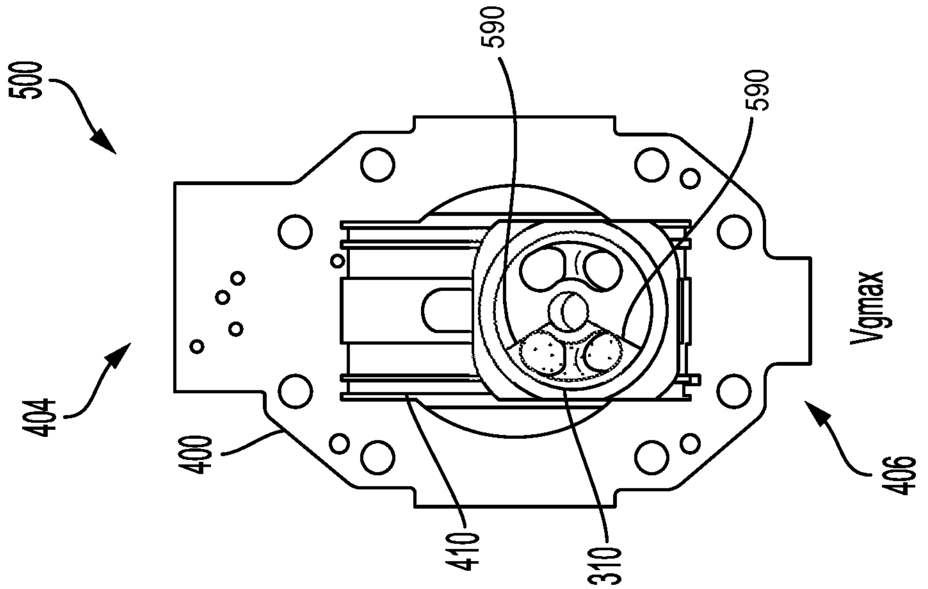
Figure 6C:
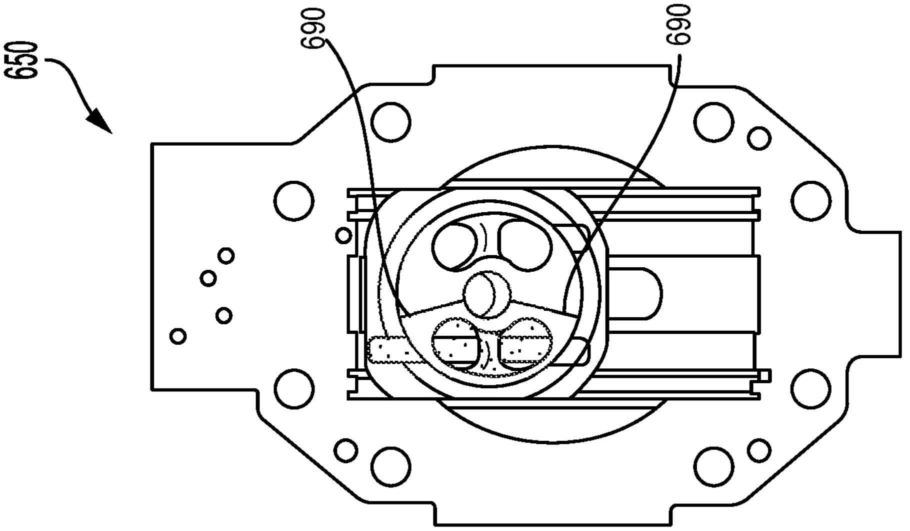
FIG. 6C (PRIOR ART)
FIGS. 6A, 6B, and 6C show different positions of a prior art example of a bent axis piston motor system.
Figure 6B:
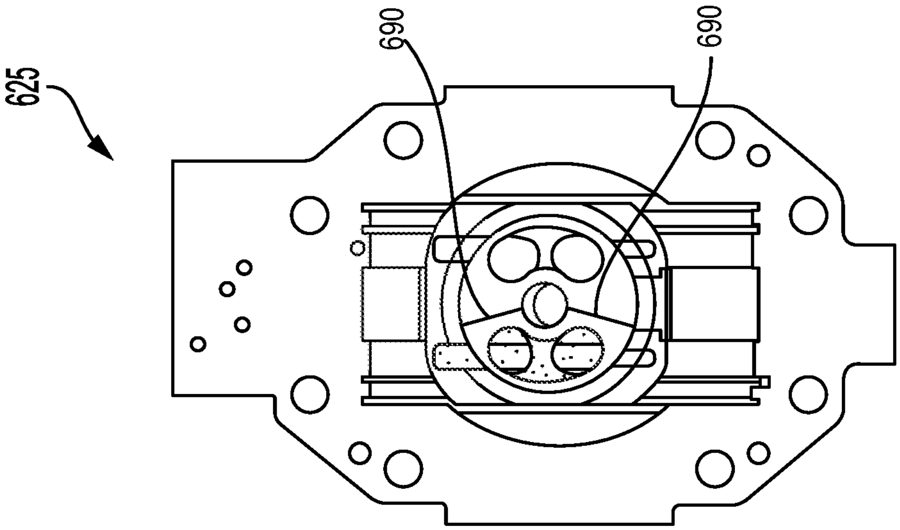
FIG. 6B (PRIOR ART)
Figure 6A:
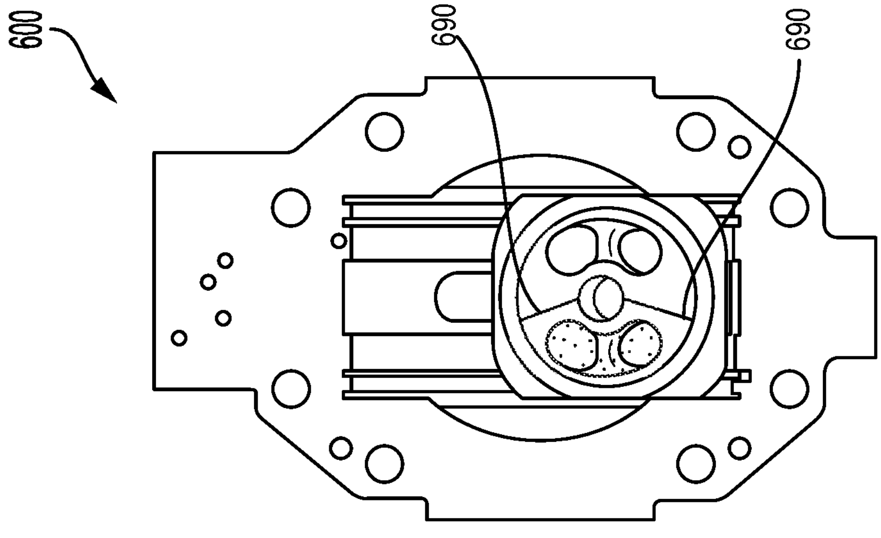
FIG. 6A (PRIOR ART)

FIG. 1 shows a schematic representation of a bent axis piston motor system, in accordance with one or more embodiments of the present disclosure. FIG. 2 shows a cross-sectional schematic of a bent axis piston motor system, in accordance with one or more embodiments of the present disclosure. FIG. 3A shows a schematic of a first side of a valve plate of a bent axis piston motor system, in accordance with one or more embodiments of the present disclosure. FIG. 3B shows a schematic of a second side of a valve plate of a bent axis motor system, in accordance with one or more embodiments of the present disclosure. FIG. 4 shows a schematic of a servo piston housing of a bent axis piston motor system, in accordance with one or more embodiments of the present disclosure. FIGS. 6A, 6B, and 6C show different positions of a prior art example of a bent axis piston motor system. FIGS. 5A, 5B, and 5C show different positions of a bent axis piston motor system comprising the valve plate and piston block of FIGS. 3A, 3B, and 4, in accordance with one or more embodiments of the present disclosure.

Referring now to FIG. 1, a schematic depiction of a bent axis motor system 100 of a vehicle 102 is shown, including a hydraulic bent axis piston motor 104 coupled to a controller 112, and to one or more wheels 110 of the vehicle via a drive shaft 120. It should be appreciated that while FIG. 1 refers to an embodiment within a vehicle, in other embodiments, bent axis motor system 100 may not be included in a vehicle, and may be included in a different machine that generates torque for a purpose other than propulsion.

Bent axis piston motor 104 includes a BAU 105. Pump 150 rotates a cylinder block (specifically, a BAU rotary group) of BAU 105 via pressurized fluids. As the cylinder block rotates, an amount of torque is generated on drive shaft 120 by pressurized hydraulic fluid pumped into BAU 105 by the pump 150. The pump 150 may be part of a hydraulic circuit comprising a regulator and/or valves for controlling the flow of hydraulic fluid. In some examples, additionally or alternatively, the hydraulic circuit may be free of valves and a valve plate of the bent axis piston motor may include features configured to automatically balance the valve plate, as described in greater detail herein. To increase or decrease the amount of torque, an inclination angle of the BAU rotary group with respect to drive shaft 120 may be adjusted. By adjusting the inclination angle, a displacement of the BAU rotary group may be increased, causing the amount of torque to increase, or the displacement of the BAU rotary group may be decreased, causing the amount of torque to decrease.

Controller 112 may include a processor 140 and a memory 142. Memory 142 may hold instructions stored therein that when executed by the processor cause the controller 112 to perform various methods, control strategies, diagnostic techniques, etc. For example, the various methods may include adjusting the inclination angle of the cylinder block with respect to drive shaft 120, to vary the amount of torque applied to drive shaft 120 (e.g., in response to an operator input). Processor 140 may include a microprocessor unit and/or other types of circuits. Memory 142 may include known data storage mediums such as random access memory, read only memory, keep alive memory, combinations thereof, etc. Memory 142 may include non-transitory memory.

Controller 112 may receive vehicle data and various signals from sensors positioned in different locations in bent axis piston motor 104 and/or vehicle 102. The sensors may include an oil temperature sensor 170, an engine velocity sensor 172, one or more wheel velocity sensors 174, and/or other sensors of bent axis piston motor 104 (e.g., torque sensors, pressure sensors, valve plate angle sensor, etc.). Controller 112 may send control signals to one or more actuators of bent axis piston motor 104, in response to operator input and/or based on the received signals from the sensors. For example, controller 112 may adjust a speed and/or torque generated on drive shaft 120 in response to operator input and/or based on the received signals from the sensors.

Bent axis motor system 100 may include one or more input devices 114. For example, input devices 114 may include a pedal of the vehicle (e.g., an accelerator pedal), a control stick (e.g., a forward-neutral-reverse (FNR) lever), one or more buttons, or similar types of control, or combinations thereof. In one example, a FNR lever is used to operate the vehicle in a forward direction or a reverse direction, and an accelerator pedal is used to increase or decrease a speed of the vehicle. The input devices 114, responsive to driver input, may generate a torque adjustment request and a desired drive direction (a forward or reverse drive direction). For instance, when a speed adjustment requested is received by the controller, an output speed of the bent axis piston motor 104 may be correspondingly increased.

Referring now to FIG. 2, a detailed schematic drawing of a BAU 200 of a bent axis piston motor is shown, which may be a non-limiting example of BAU 105 of bent axis piston motor 104 described above in reference to FIG. 1. BAU 200 includes a BAU rotary group 202, housed within a housing 201 of BAU 200. BAU rotary group 202 includes a cylinder block 203, which houses a plurality of pistons 206 that slide within a corresponding plurality of respective chambers 217 of cylinder block 203. A flange 207 may be rotated by pistons 206 via hydraulic pressure as BAU rotary group 202 is rotated. The central joint 205 may include a holding spring 213, which may provide a force countering the hydraulic pressure to maintain a respective piston 206 in a desired position within a respective chamber 217.

BAU rotary group 202 may function as a variator that provides a variable output torque on a drive shaft 204 based on an inclination angle 280 of cylinder block 203 with respect to drive shaft 204. The equal number of respective chambers 217 may ride on a variable angle valve plate 208, such that a range of movement of the pistons 206 is set by an adjustable inclination angle 280 between valve plate 208 of BAU rotary group 202 and drive shaft 204. Pistons 206 may be coupled to flange 207 via a universal or ball joint 205, which may allow flange 207 to be rotated by pistons 206 as inclination angle 280 is adjusted.

Flange 207 may be mechanically coupled to drive shaft 204 via a plurality of roller bearings 209 housed within a respective plurality of bearing housings 211, such that as flange 207 is rotated by rotating pistons 206, a rotation of flange 207 is transferred to drive shaft 204. Housing 201 may include a shaft seal 250, which may seal BAU 200 around a surface of drive shaft 204.

Chambers 217 are in fluid communication with a hydraulic system, where a hydraulic fluid fills chambers 217 and intervening conduits. Chambers may be coupled to hydraulic conduits through which the hydraulic fluid circulates between the hydraulic system and chambers 217. During operation of variable fluid motor, the hydraulic system may flow the hydraulic fluid to chambers 217 via an inlet hydraulic circuit, and receive the hydraulic fluid back from chambers 217 via an outlet hydraulic circuit.

The variable angle valve plate 208 may be coupled to a control piston 216 of BAU 200 within a servo piston housing 222. Control piston 216 may be actuated by hydraulic fluid to adjust inclination angle 280 between variable angle valve plate 208 and drive shaft 204. Control piston 216 is interchangeably referred to herein as servo piston 216.

In one example, the variable angle valve plate 208 is coupled to the control piston 216 via a cam joint 218, where inclination angle 280 is adjusted as control piston 216 slides within a control piston chamber 220 of servo piston housing 222. Control piston 216 may slide in a first direction indicated by an upward arrow 282, or a second direction indicated by a downward arrow 284 (e.g., in a Z dimension as indicated in reference coordinates 290). In various embodiments, valve plate 208 may be slid along a curved, slidable surface 214 of servo piston housing 222 in response to a movement of control piston 216. For example, valve plate 208 may be slid in a first rotational direction indicated by arrow 285 (e.g., counterclockwise) by actuating control piston 216 within piston chamber 220 in the first direction indicated by upward arrow 282, and valve plate 208 may be slid in a second rotational direction indicated by arrow 286

(e.g., clockwise) by actuating control piston 216 within piston chamber 220 in the second direction indicated by downward arrow 284.

In response to the movement of control piston 216, valve plate 208 may be slid over a range of positions corresponding to different inclination angles 280. For example, control piston 216 may be actuated to a first end 225 of piston chamber 220. When control piston 216 is actuated to the first end 225 of piston chamber 220, valve plate 208 may be slid into a position that minimizes a displacement of chambers 217 where inclination angle 280 is zero, and pistons 206 are aligned with drive shaft 204. Control piston 216 may be actuated to a second end 227 of piston chamber 220, opposite the first end 225. When control piston 216 is actuated to the second end 227 of piston chamber 220, valve plate 208 may be slid into a position that maximizes a displacement of chambers 217 where inclination angle 280 is greatest, and pistons 206 are angled to drive shaft 204.

As inclination angle 280 varies, a greater or lesser volume of hydraulic fluid is received or taken from the chambers of the pistons 206. If a greater volume of hydraulic fluid is received from the chambers of the pistons 206, an output speed of drive shaft 204 may be increased, while if a lesser volume of hydraulic fluid received from the chambers of the pistons 206, the output speed of drive shaft 204 may be decreased. Thus, the output speed of BAU 200 varies with and is controlled by the angle of valve plate 208.

In one example, the BAU 200 may include further components such as a displacement feedback spring mounted on a guide rod, which may provide a force counteracting forces generated by hydraulic fluid on control piston 216 to control a position of servo piston 216; one or more ports and corresponding conduits through which hydraulic fluid is flowed into and out of control piston chamber 220. A hydraulic spool valve that controls a pressure of the hydraulic fluid in the servo piston chamber 220; and a dedicated regulator (e.g., solenoid) to control a set point force over the hydraulic spool valve. The guide rod and displacement feedback spring, regulator, and/or other components included in the alternative electro-hydraulic system may occupy a space adjacent to servo piston chamber 220, such as the space indicated by the dashed lines of a rectangular box 240 in FIG. 2.

Turning now to FIG. 3A, it shows an embodiment 300 of a valve plate 310. The valve plate 310 may be a non-limiting example of valve plate 208 of FIG. 2. The embodiment 300 may illustrate a first side 302 of the valve plate 310, which may interact with one or more pistons, such as pistons 206 of FIG. 2. That is to say, the first side 302 may face the cylinder block 203 of FIG. 2. Hydraulic fluids may be present between the cylinder block 203 and the first side 302, wherein a spacing between the first side 302 of the valve plate 310 and the cylinder block 203 may be determined based on a pressure of the hydraulic fluid. The valve plate 310 may include a plurality of openings including a central opening 320, a first outer opening 321, and a second outer opening 325 that extend through an entire thickness of the valve plate 310 in the x-direction. The first outer opening 321 may include a first pair of openings including a first opening 322 and a second opening 324. The second outer opening 325 may include a second pair of openings including a third opening 326 and a fourth opening 328.

The first and second outer openings 321, 325 may surround the central opening 320. At least one piston of a cylinder block of the motor may interact and/or engage with the central opening 320, the first outer opening 321, and/or the second outer opening 325. A first divider 332 may be arranged between the first opening 322 and the second opening 324. The first divider 332 may include an hour glass shape such that surfaces of the first divider 332 match an arc shape of the first opening 322 and the second opening 324. Said another way, the first divider 332 shapes inner surfaces of the first opening 322 and the second opening 324. A height of the first divider may be less than a height of the first outer opening 321, such that the first divider 332 is recessed relative to an edge of the first outer opening 321.

A second divider 334 may be arranged between the third opening 326 and the fourth opening 328 in the second outer opening 325. The second divider 334 may be identical to the first divider 332 in size and shape and may be positioned symmetrically opposing first divider 332. The second divider 334 may include an hour glass shape such that surfaces of the second divider 334 match an arc shape of the third opening 326 and the fourth opening 328. A height of the second divider 334 may be less than a height of the second outer opening 325 such that the second divider 334 is recessed relative to an edge of the second outer opening 325.

Each of the first through fourth openings includes an adjacent recess. More specifically, a first recess 342 may be adjacent to the first opening 322, a second recess 344 may be adjacent to the second opening 324, a third recess 346 may be adjacent to the third opening 326, and a fourth recess 348 may be adjacent to the fourth opening 328. The recesses may be identical to one another in size and shape. Each of the recesses may extend from a rim of a corresponding opening in a direction normal to tangent. The recesses may include a half-cone shape. Additionally or alternatively, the recesses may include a half-sphere shape, a half pyramid shape, or other shape.

In one example, the central opening 320 may be circular. The first, second, third, and fourth openings of the first and second outer openings 321, 325 may be circular and interact with the pistons of the BAU. The first and second outer openings 321, 325 may be oblong, wherein the corresponding dividers may shape the first through fourth openings into circles or close to circle shapes (e.g., oblong). By being oblong, an angle of the valve plate 310 may change while still allowing the first through fourth openings to interact with the pistons.

Dashed lines intersect tips of the four recesses 342, 344, 346, and 348, thereby defining corresponding fluid distribution arcs of the first and second outer openings. The fluid distribution arcs, also referred to herein as distribution arcs, representing an area in which fluid may contact the valve plate. More specifically, a first distribution circuit may correspond with a first distribution arc 381 adjacent to the first opening 322 and the second opening 324. A second distribution circuit may correspond with a second distribution arc 382 adjacent to the third opening 326 and the fourth opening 328. The first distribution arc 381 may be identical to the second distribution arc 382 in arc length. In one example, the first distribution circuit may provide fluid at a first pressure and the second distribution circuit may provide the fluid at a second pressure, different than the first pressure.

The first distribution circuit may further include a first groove 352 and a second groove 354. The first groove 352 may be arranged between an outer rim of the valve plate 310 and the first outer opening 321. The second groove 354 may be arranged between the first outer opening 321 and the central opening 320. Each of the first groove 352 and the second groove 354 may be shorter than the first distribution arc 381. That is to say, the length of the first distribution arc 381 at the location corresponding to the first groove 352 is longer than the length of the first groove 352. The first groove 352 may include a port 353 and the second groove 354 may include a port 355. The port 353 may be configured to flow fluid to and/or drain fluid from the first groove 352. The port 355 may be configured to flow fluid to and/or drain fluid from the second groove 354.

In one example, the length of the first groove 352 may be greater than the length of the second groove 354. A ratio of the length of the first groove 352 to a corresponding first distribution arc length may be equal to a ratio of the length of the second groove 354 to a corresponding first distribution arc length. Additionally or alternatively, the ratios may be different.

The second distribution circuit may further include a third groove 356 and a fourth groove 358. The third groove 356 may be arranged between an outer rim of the valve plate 310 and the second pair of openings. The fourth groove 358 may be arranged between the second pair of openings and the central opening 320. Each of the third groove 356 and the fourth groove 358 may be shorter than a corresponding arc length of the second distribution arc 382. That is to say, the length of the second distribution arc 382 at the location corresponding to the third groove 356 is longer than the length of the third groove 356. The third groove 356 may include a port 357 and the fourth groove 358 may include a port 359. The port 357 may be configured to flow fluid to and/or drain fluid from the third groove 356. The port 359 may be configured to flow fluid to and/or drain fluid from the fourth groove 358.

In one example, the length of the third groove 356 may be greater than the length of the fourth groove 358. A ratio of the length of the third groove 356 to a corresponding second distribution arc length may be equal to a ratio of the length of the fourth groove 358 to a corresponding second distribution arc length. Additionally or alternatively, the ratios may be different.

The first groove 352 and the third groove 356 may be substantially identical in size and shape. The second groove 354 and the fourth groove 358 may be substantially identical in size and shape. In one example, the valve plate 310 is symmetric. Each of the grooves may include a curved shape following a radius of a circle. Additionally or alternatively, the grooves may include a curved shape following a radius of an oblong.

The first groove 352, the second groove 354, the third groove 356, and the fourth groove 358 may include a semi-circular shape. A cross-sectional shape of the first groove 352, the second groove 354, the third groove 356, and the fourth groove 358 may be a half-circle. Surfaces of the grooves may be curved and not linear. As such, walls of the grooves may be curved.

The first plurality of grooves including the first groove 352, the second groove 354, the third groove 356, and the fourth groove 358 may enhance an imbalance tolerance of the valve plate 310 of the motor. A size and a shape of the grooves may expand the imbalance tolerance while guiding fluid only based on their shape to achieve an automatic balancing. The flow of fluid may change as fluid pressures change, along with motor speeds, and ambient conditions (e.g., vibrations due to unevenness, temperature, and the like).

Turning now to FIG. 3B, it shows a second side 304 of the valve plate 310. The second side 304 may be opposite the first side 302 and face a port cover 400 of the servo piston housing 222 as shown in FIG. 4. The central opening 320 extends through an entire body of the valve plate 310 such that the central opening 320 is present on the second side 304. The second side 304 may include a first slot 362 and a second slot 364. The first slot 362 may be fluidly coupled to the first opening 322 and the second opening 324. The second slot 364 may be fluidly coupled to the third opening 326 and the fourth opening 328.

The first slot 362 and the second slot 364 may be cutouts arranged in the second side 304. The second side 304 may be convex and dome toward the control piston 216. As such, a channel in which the valve plate 310 is actuated may be curved to match a curvature of the second side 304.

The second side 304 may further include a first cutout 372 and a second cutout 376. The first cutout 372 may be adjacent to the first slot 362. In one example, the first cutout 372 is arranged between the outer rim of the valve plate 310 and the first slot 362. The first cutout 372 may be positioned such that it is biased toward an end of the first slot 362 adjacent to the first opening 322. In one example, the first cutout 372 extends from the first divider 332, past an entirety of the first opening 322, and toward an end of the first slot 362. In one example, the first cutout 372 and the second cutout 376 may be a second plurality of grooves, wherein the grooves on the first side of the valve plate are a first plurality of grooves.

The first cutout 372 may include a port 374. The port 374 may be arranged on a surface of the first cutout 372 near the first divider 332 such that the port 374 is angled relative to the x-axis. In one example, the port 374 is fluidly coupled to the port 353 of the first groove 352 of FIG. 3A. As such, fluid in the first cutout 372 may flow to the first groove 352 and vice-versa.

The second cutout 376 is arranged between the outer rim of the valve plate 310 and the second slot 364. The second cutout may be positioned such that it is biased toward an end of the second slot 364 adjacent to the third opening third opening 326. In one example, the second cutout 376 extends from the second divider 334, past an entirety of the third opening 326, and toward an end of the second slot 364.

The second cutout 376 may include a port 378. The port 378 may be arranged on a surface of the second cutout 376 near the second divider 334 such that the port 378 is angled relative to the x-axis. In one example, the port 378 is fluidly coupled to the port 357 of the third groove 356 of FIG. 3A. As such, fluid in the second cutout 376 may flow to the third groove 356 and vice-versa.

In one example, a size and a shape of the first cutout 372 may be identical to the second cutout 376. The first cutout 372 and the second cutout 376 may be shaped to match a portion of a circle or other round shape. In one embodiment, the first cutout 372 and the second cutout 376 include a half-circle shape in a second plane normal to a first plane in which the grooves on the first side are arranged. A cross-sectional shape of the first cutout 372 and the second cutout 376 may be U-shaped or square shaped.

The second side 304 thus includes a second plurality of grooves and/or cutouts including the first cutout 372 and the second cutout 376. The first cutout 372 and the second cutout 376 may receive and/or flow fluid to the first groove 352 and the third groove 356, respectively. The port 353 may be fluidly coupled to the port 374. The port 357 may be fluidly coupled to the port 378. A balancing of the valve plate 310 via the grooves is described in greater detail below.

Turning now to FIG. 4, it shows a port cover 400 of a servo piston housing. In one example, the port cover 400 may be included in the servo piston housing 222 of FIG. 2. The port cover 400 may include a plurality of openings 402. The plurality of openings 402 may include openings for conducting various fluids, such as lubricants and hydraulic fluids, along with openings for receiving fasteners.

The plurality of openings 402 may surround a recess 410 of the port cover 400. In one example, the recess 410 may be shaped to receive the valve plate 310. More specifically, the second side 350 of the valve plate 310 may interface with a surface 412 of the recess 410. In one example, the surface 412 is curved to match the curvature of the second side 350 of the valve plate 310.

A central opening 420 may be centrally located on the recess 410. The central opening 420 may be configured to flow fluid to and/or from an interior of the port cover 400 from and/or to the valve plate 310. A first side opening 422 and a second side opening 424 may be arranged on opposite sides of the central opening. The first and second side openings may be configured to flow fluid to and/or from an interior of the port cover 400 from and/or to the valve plate 310.

The recess 410 further includes a housing cutout 426. The housing cutout 426 may be arranged closer to the first side opening 422 than the second side opening 424. More specifically, the housing cutout 426 is closer to the first side opening 422 than the central opening 420, and closer to the central opening than the second side opening 424. In one example, the housing cutout 426 is biased toward a first extreme end 404 of the port cover 400, the first extreme end opposite a second extreme end 406 of the port cover 400.

The housing cutout 426 may include a port 428. The port 428 may be configured to flow fluid to and/or away from the housing cutout 426. In one example, the port 428 of the housing cutout 426 may align with the port 374 or the port 378 of FIG. 3B in some positions of the valve plate 310. The port 428 may be arranged in an exact middle of the housing cutout 426. In one example, the port 428 is arranged toward an end of the housing cutout 426 closer to the first extreme end 404. The port cover 400 may further include port 432 and port 434. Each of the ports of the valve plate 310 and the port cover 400 may be in fluid communication such that fluids may flow from the port cover 400 to the valve plate 310 and vice versa. Furthermore, the grooves, cutouts, and ports may allow the fluids to automatically balance the valve plate 310 relative to the port cover 400 and the cylinder block 203 by flowing fluids from areas of higher pressure to areas of lower pressure.

Turning now to FIGS. 5A, 5B, and 5C, they show a first position 500, a second position 525, and a third position 550 of the valve plate 310 in the port cover 400, respectively. In the first position 500, the valve plate 310 is at an extreme end of the recess 410 closest to the second extreme end 406 of the port cover 400. In one example, the valve plate 310 is actuated to the first position 500 in response to a fluid pressure being greater than or equal to an upper threshold pressure. In the second position 525, the valve plate 310 is in a middle of the recess 410 and approximately equidistant from the first extreme end 404 and the second extreme end 406 of the port cover 400. In one example, the valve plate 310 is actuated to the second position 525 in response to a fluid pressure being less than the upper threshold pressure and greater than a lower threshold pressure. In the third position 550, the valve plate 310 is at an extreme end of the recess 410 closest to the first extreme end 404 of the port cover 400. In one example, the valve plate 310 is actuated to the third position 550 in response to a fluid pressure being less than the lower threshold pressure.

In one example, the grooves and cutouts of the valve plate 310 and the recess 410 may provide automatic variable balancing, resulting in improve mechanical and volumetric efficiency. In one example, the grooves and cutouts may expand an area of the valve plate 310 exposed to higher pressures compared to prior art examples shown in FIGS. 6A, 6B, and 6C. In one example, the pressure distribution in the prior art examples results in high pressures in areas near the first and second pairs of openings and lower pressures in areas outside of the pairs of openings. In the examples of FIGS. 5A, 5B, and 5C, the high pressure areas are expanded to extend from the first and second pairs of openings to the grooves of the first side of the valve plate. Additionally or alternatively, the high pressure areas of the examples of FIGS. 5A-5C may be confined to a boundary near the pair of openings, as shown by boundary lines 590. In the prior art examples, fluid pressure application may be confined to a boundary more distal to the pair of openings than the examples of FIGS. 5A-5C, defined by boundary lines 690. By doing this, the valve plate 310 may provide an automatic variable balancing. Automatic balancing may include where the fluid is not actively controlled via a signal, a pressure, or other communication to a device resulting in a mechanical actuation thereof. The fluid is free to flow in a direction of balance based on various pressure differentials, wherein the grooves, cutouts, and corresponding ports allow the fluid to correct an imbalance that would otherwise be present in a prior art example.

In one example, the valve plate includes a first side in contact with the cylinder block and a second side in contact with the port cover of the servo piston housing. As the pressure on the first side of the valve plate increases, the force may increase a gap between the valve plate and the cylinder block, which may allow hydraulic fluid (e.g., oil) to leak between the two components and a volumetric efficiency to decrease. If the pressure on the second side of the valve plate increases, the force may decrease the gap between the valve plate and the cylinder block, and thus the friction between the two components may increase and a mechanical efficiency may decrease. The grooves and cutouts of the valve plate may ameliorate the reductions in inefficiencies described above. For example, if the pressure of the first side is high, the hydraulic fluid may be forced through the grooves and cutouts to the second side, providing a force on the second side to counter the high pressure on the first side, thereby achieving an automatic balancing. In this way, the grooves and cutouts of the valve plate may allow hydraulic fluids to flow to a lower pressure side of the valve plate to achieve automatic balancing.

The disclosure provides support for a bent axis piston motor including a valve plate coupled to at least one piston of a cylinder block, the valve plate comprising a first plurality of grooves spaced about openings of the valve plate on a first side of the valve plate facing the cylinder block, the valve plate further comprising a second plurality of grooves arranged on a second side of the valve plate facing away from the cylinder block, and a port cover comprising a plurality of ports for flowing fluids to the valve plate. A first example of the bent axis piston motor further includes where the first plurality of grooves is arranged in a first plane and the second plurality of grooves is arranged in a second plane normal to the first plane. A second example of the bent axis piston motor, optionally including the first example, further includes where each of the first and second plurality of grooves comprises a port. A third example of the bent axis piston motor, optionally including one or more of the previous examples, further includes where the second plurality of grooves are biased toward one end of the valve plate. A fourth example of the bent axis piston motor, optionally including one or more of the previous examples, further includes where the first plurality of grooves comprises a first groove, a second groove, a third groove, and a fourth groove, and wherein the first groove is identical to the fourth groove and the second groove is identical to the third groove, wherein the second and third grooves are different than the first and fourth grooves. A fifth example of the bent axis piston motor, optionally including one or more of the previous examples, further includes where the second plurality of grooves are fluidly coupled to only the first and fourth grooves. A sixth example of the bent axis piston motor, optionally including one or more of the previous examples, further includes where the first plurality of grooves comprises a half-circle cross-sectional shape. A seventh example of the bent axis piston motor, optionally including one or more of the previous examples, further includes where the second plurality of grooves comprises a square cross-sectional shape.

The disclosure provides further support for a system including a variable fluid displacement bent axis piston motor comprising a cylinder block and a plurality of pistons, the motor further comprising a valve plate comprising a central opening between a first pair of openings and a second pair of openings on a first side of the valve plate facing the plurality of pistons, a first groove is arranged between the first pair of openings and an outer rim of the valve plate, a second groove is arranged between the first pair of openings and the central opening, a third groove is groove is arranged between the central opening and the second pair of openings, and a fourth groove is arranged between the second pair of openings and the outer rim of the valve plate, the valve plate, the valve plate further comprises a second side facing away from the plurality of pistons, the second side comprising a first cutout arranged between a first slot and the outer rim and a second cutout arranged between a second slot and the outer rim. A first example of the system further includes where the first, second, third, and fourth grooves comprise curved walls. A second example of the system, optionally including the first example, further includes where the first cutout and the second cutout comprise linear walls. A third example of the system, optionally including one or more of the previous examples, further includes where the first slot extends from the first and second openings, and wherein the second slot extends from the third and fourth openings. A fourth example of the system, optionally including one or more of the previous examples, further includes where the first cutout is closer to the first opening than the second opening, and wherein the second cutout is closer to the third opening than the fourth opening. A fifth example of the system, optionally including one or more of the previous examples, further includes where an arc length of the first groove and the second groove is less than a first distribution arc, and an arc length of the third groove and a fourth groove is less than a second distribution arc. A sixth example of the system, optionally including one or more of the previous examples, further includes where the first distribution arc is identical to the second distribution arc.

The disclosure provides additional support for a valve plate for a bent axis motor, the valve plate including a plurality of openings on a first side of the valve plate facing pistons of the motor, the plurality of openings comprising a central opening, a first opening, and a second opening, a plurality of grooves on the first side of the valve plate arranged between an outer rim of the valve plate, the central opening, the first opening, and the second opening, the plurality of grooves comprising a semi-circular cross-sectional shape, and a plurality of cutouts on a second side of the valve plate opposite the first side, the plurality of cutouts comprising a first cutout adjacent to the first opening and a second cutout adjacent to the second opening. A first example of the valve plate further includes where the plurality of grooves and the plurality of cutouts are semi-circular. A second example of the valve plate, optionally including the first example, further includes where the plurality of grooves comprises two first arc length grooves and two second arc length grooves. A third example of the valve plate, optionally including one or more of the previous examples, further includes where the two first arc length grooves are shorter than the two second arc length grooves. A fourth example of the valve plate, optionally including one or more of the previous examples, further includes where the two first arc length grooves are arranged between the central opening, the first opening, and the second opening, and wherein the two second arc length grooves are arranged between the first opening, the second opening, and the outer rim of the valve plate.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific embodiments are not to be considered in a limiting sense, because numerous variations are possible. As used herein, an element or step recited in the singular and proceeded with the word “a” or “an” should be understood as not excluding plural of said elements or steps, unless such exclusion is explicitly stated. Furthermore, references to “one embodiment” of the present invention are not intended to be interpreted as excluding the existence of additional embodiments that also incorporate the recited features.

Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

FIGS. 2-6C show example configurations with relative positioning of various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-5C are shown approximately to scale. However, other dimensions should be used if desired.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A bent axis piston motor, comprising:

a valve plate coupled to at least one piston of a cylinder block, the valve plate comprising a first plurality of grooves spaced about openings of the valve plate on a first side of the valve plate facing the cylinder block, the valve plate further comprising a second plurality of grooves arranged on a second side of the valve plate facing away from the cylinder block and biased toward one end of the valve plate; and a port cover comprising a plurality of ports for flowing fluids to the valve plate.

2. The bent axis piston motor of claim 1, wherein the first plurality of grooves is arranged in a first plane and the second plurality of grooves is arranged in a second plane normal to the first plane.

3. The bent axis piston motor of claim 1, wherein each of the first and second plurality of grooves comprises a port.

4. The bent axis piston motor of claim 1, wherein the first plurality of grooves comprises a first groove, a second groove, a third groove, and a fourth groove, and wherein the first groove is identical to the fourth groove and the second groove is identical to the third groove, wherein the second and third grooves are different than the first and fourth grooves.

5. The bent axis piston motor of claim 4, wherein the second plurality of grooves are fluidly coupled to only the first and fourth grooves.

6. The bent axis piston motor of claim 1, wherein the first plurality of grooves comprises a half-circle cross-sectional shape.

7. The bent axis piston motor of claim 1, wherein the second plurality of grooves comprises a square cross-sectional shape.

8. A system, comprising:

a variable fluid displacement bent axis piston motor comprising a cylinder block and a plurality of pistons, the motor further comprising a valve plate comprising a central opening between a first pair of openings and a second pair of openings on a first side of the valve plate facing the plurality of pistons, a first groove is arranged between the first pair of openings and an outer rim of the valve plate, a second groove is arranged between the first pair of openings and the central opening, a third groove is arranged between the central opening and the second pair of openings, and a fourth groove is arranged between the second pair of openings and the outer rim of the valve plate, the valve plate further comprises a second side facing away from the plurality of pistons, the second side comprising a first cutout arranged between a first slot and the outer rim and a second cutout arranged between a second slot and the outer rim.

9. The system of claim 8, wherein the first, second, third, and fourth grooves comprise curved walls.

10. The system of claim 8, wherein the first cutout and the second cutout comprise linear walls.

11. The system of claim 8, wherein the first slot extends from the first and second openings, and wherein the second slot extends from the third and fourth openings.

12. The system of claim 11, wherein the first cutout is closer to the first opening than the second opening, and wherein the second cutout is closer to the third opening than the fourth opening.

13. The system of claim 8, wherein an arc length of the first groove and the second groove is less than a first distribution arc, and an arc length of the third groove and the fourth groove is less than a second distribution arc.

14. The system of claim 13, wherein the first distribution arc is identical to the second distribution arc.

15. A valve plate for a bent axis motor, the valve plate comprising:

a plurality of openings on a first side of the valve plate facing pistons of the motor, the plurality of openings comprising a central opening, a first opening, and a second opening, a plurality of grooves on the first side of the valve plate arranged between an outer rim of the valve plate, the central opening, the first opening, and the second opening, the plurality of grooves comprising a semi-circular cross-sectional shape; and a plurality of cutouts on a second side of the valve plate opposite the first side, the plurality of cutouts comprising a first cutout adjacent to the first opening and a second cutout adjacent to the second opening.

16. The valve plate of claim 15, wherein the plurality of grooves and the plurality of cutouts are semi-circular.

17. The valve plate of claim 15, wherein the plurality of grooves comprises two first arc length grooves and two second arc length grooves.

18. The valve plate of claim 17, wherein the two first arc length grooves are shorter than the two second arc length grooves.

19. The valve plate of claim 17, wherein the two first arc length grooves are arranged between the central opening, the first opening, and the second opening, and wherein the two second arc length grooves are arranged between the first opening, the second opening, and the outer rim of the valve plate.

* * * * *